Figure 1:
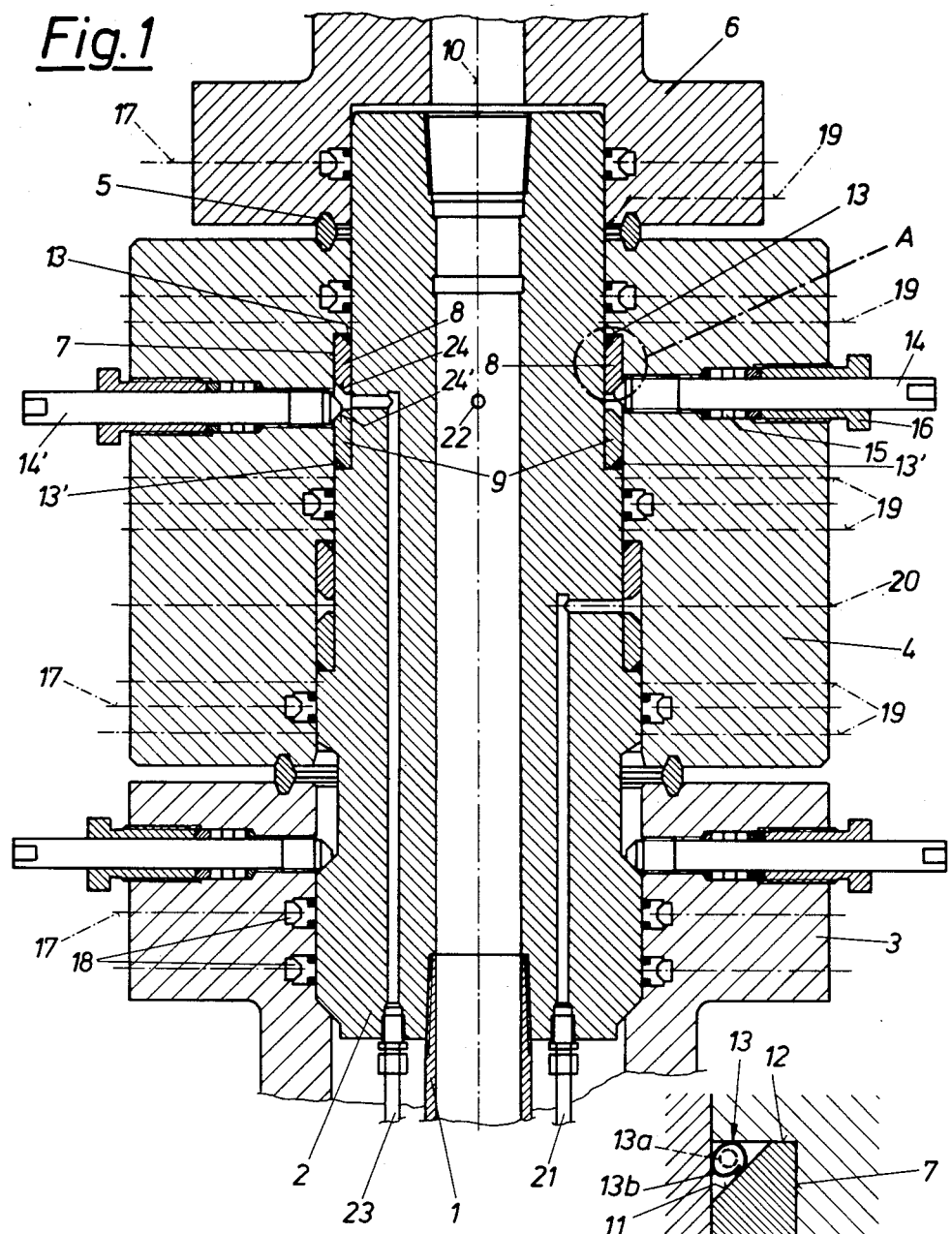

United States Patent [19]

Kropatsch

[11] Patent Number: 4,770,426

[45] Date of Patent: Sep. 13, 1988

[54] SEALING STRUCTURE FOR THE UPPER END OF A RISING OR CONVEYING PIPELINE

[76] Inventor: Wolfgang Kropatsch, 56-58 Pappenheimgasse, A-1200 Vienna, Austria

[21] Appl. No.: 39,264

[22] Filed: Apr. 17, 1987

[30] Foreign Application Priority Data

Apr. 24, 1986 [AT] Austria ................................. 1100/86

[51] Int. Cl.⁴ ........................... F16J 15/08; F16J 15/28
[52] U.S. Cl. ....................................... 277/236; 277/30; 277/118; 277/191; 277/227
[58] Field of Search ................... 277/30, 31, 117–122, 277/190, 191, 227, 229, 235 R, 236

[56] References Cited

U.S. PATENT DOCUMENTS

| | | | |
|---|---|---|---|
| 4,218,067 | 8/1980 | Halling | 277/236 X |
| 4,290,614 | 9/1981 | Moll | 277/236 X |
| 4,384,730 | 5/1983 | Diehl | 277/236 |
| 4,390,186 | 6/1983 | McGee et al. | 277/236 |
| 4,561,662 | 12/1985 | de Villepoix et al. | 277/229 |

Primary Examiner—Robert S. Ward
Attorney, Agent, or Firm—Beveridge, DeGrandi & Weilacher

[57] ABSTRACT

A sealing structure for the upper end of a rising or conveying pipeline, which sealing structure is provided between the riser pipe hanger and the riser pipe cover and aims at providing a metallic seal whose safety is superior to that of the seals known up to now. This is achieved by the insertion of metallic O-ring seals (13, 13') in annular spaces of triangular cross section of which one end wall is formed by the inclined contact pressure shoulder (11) of a thrust collar (8,9) which can be subjected to pressure by means of clamping spindles (14, 14') arranged essentially at right angles in relation to the rise pipe axis (10) and screwed into the riser pipe cover (4), whereby an additional pressing of the seals (13, 13') is made possible.

7 Claims, 1 Drawing Sheet

SEALING STRUCTURE FOR THE UPPER END OF A RISING OR CONVEYING PIPELINE

The invention relates to a sealing structure for the upper end of a rising or conveying pipeline, which sealing structure is provided between the riser pipe hanger and the riser pipe cover.

In order to assure a safe sealing between highly corrosive, highly toxic conveying media in natural gas probes ($H_2S$, $CO_2$) and the environment, it is necessary to provide a metallic seal. It is the object of the present invention to provide such a metallic seal whose safety surpasses that of the seals known up to now.

According to the invention, this object is achieved in the sealing structure initially mentioned by providing an annular groove or channel in the wall receiving the riser pipe hanger in the riser pipe cover or in the outer wall of the riser pipe hanger, in which groove an upper and a lower thrust collar or supporting ring is arranged in the direction of the axis of the riser pipe side by side and preferably with play therebetween, which thrust collars are provided on at least one of their front faces each with an inclined contact pressure shoulder preferably extending at an angle of 45 degrees to the rise pipe axis, with a portion of each of said front faces remaining as a straight stop edge, by inserting a metallic O-ring seal into the annular space defined by the contact pressure shoulder facing the riser pipe hanger and provided on the upper front face of the upper thrust collar and by the riser pipe hanger as well as in the annular space defined by the contact pressure shoulder facing the riser pipe cover and provided on the lower front face of the lower thrust collar and by the riser pipe cover and by providing clamping spindles having conical front ends equidistantly over the periphery of the riser pipe cover and extending essentially at right angles to the riser pipe axis, which front ends are provided for contacting the lower front face of the upper thrust collar or the upper front face of the lower thrust collar. It is convenient to also provide the lower front face of the upper thrust collar and the upper front face of the lower thrust collar with inclined contact pressure shoulders facing the riser pipe cover.

An individual adjustment possibility for the upper and lower O-ring seal is provided according to a further feature of the invention by providing for the clamping spindles to alternately contact only the lower front face of the upper thrust collar or the upper front face of the lower thrust collar.

Particularly good results are obtained with the sealing structure according to the invention if the metallic O-ring seal is formed in a manner known per se of an O-ring shaped helical spring with a preferably double metal casing. The casing(s) can be slotted in a manner known per se with its (their) edges overlapping at the contact pressure shoulder.

The invention is explained by means of an exemplary embodiment under reference to the accompanying drawing.

Figure 2:
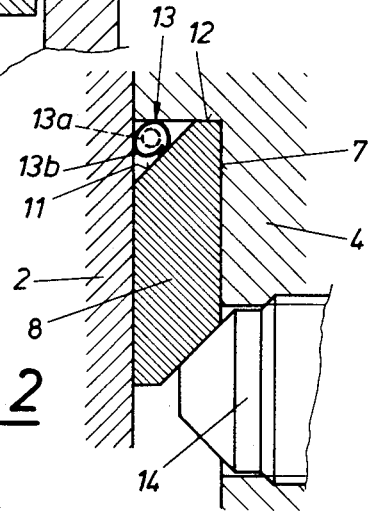

FIG. 1 shows a longitudinal cross section through the upper elements or a riser pipe closing and FIG. 2 schematically shows the detail A of FIG. 1 in enlarged but distorted scale.

The riser pipe or conveying line 1 terminates in the riser pipe hanger 2 which in turn is arranged in the riser pipe coil 3 and in the riser pipe cover 4. On the upper side of the riser pipe cover 4, the christmas tree 6 is attached via a ring jount seal 5. The reference number 7 designates the annuar groove or channel in the wall of the bore receiving the riser pipe hanger 2 in the riser pipe cover 4 or in the outer wall of the riser pipe hanger 2 in which an upper and a lower thrust collar or supporting ring (upper 8, lower 9) are arranged in the direction of the riser pipe axis 10 side by side and preferably with play therebetween.

The upper thrust collar 8 is provided on its upper front face with an inclined contact pressure shoulder 11 facing the riser pipe hanger 2, with a portion of said front face remaining as a straight stop edge 12 (FIG. 2). In the exemplary embodiment shown, the inclined contact pressure shoulder 11 extends in an angle of 45 degrees to the riser pipe axis 10.

A metallic O-ring seal 13, preferably one which is commercially available under the trade name "Hélicoflex", is inserted in the triangular annular space defined by the contact pressure shoulder 11 and the riser pipe hanger 2 or the upper shoulder of the groove 7. This Hélicoflex seal marketed by the French firm of the same name consists of an interior, O-ring shaped helical spring 13a (FIG. 2) with a double metal casing 13b which is slotted and overlaps.

This seal consists of the following materials:
Outer casing: Monel
Inner (intermediary) casing: Inconel 600
Spring: Nimonic 90

This combination of materials has the highest corrosion resistance for using with natural gases. The temperature ranges from $-258°$ C. to $+700°$ C.

It is the purpose of the thrust collar 8 to guide and center the Hélicoflex seal 13 and to press it through the 45 degree shoulder 11. In this case, the stop edge 12 prevents an excessive stress on the seal 13. The thrust collar 8 establishes a three-point contact between hanger 2, hanger coil or riser pipe cover 4 and the 45 degree shoulder 11. The major advantage of this three-point contact resides in that the axial movement of the hanger 2 does not exert any influence on the sealing properties.

The force for pressing the seal 13 is generated by clamping spindles 14 distributed over the circumference of the riser pipe cover 4; the conical front ends of the clamping spindles contact the conveniently also inclined lower front face 24 of the upper thrust collar 8 and the clamping spindles are screwed into the riser pipe cover approximately perpendicular in relation to the riser pipe axis 10. The clamping spindles 14 permit an additional pressing of the seal 13 from the outside, excessive pressing being prevented by the stop edge 12.

The lower front face of the lower thrust collar 9 is formed in analogy to the upper front face of the upper thrust collar 8, i.e. with a 45 degree contact pressure shoulder and a stop edge; the 45 degree contact pressure shoulder, however, faces the riser pipe cover 4. In this case, as well, a metallic O-ring seal 13', preferably the Hélicoflex seal previously described in detail, is inserted in the annular space of triangular cross section formed by the 45 degree shoulder. Additional pressing of the seal 13' from the outside is effected by means of the clamping spindles 14' arranged in analogy to the clamping spindles 14, but slightly offset downwards, the conical ends of the clamping spindles 14' contacting the correspondingly inclined upper front face 24' of the lower thrust collar 9. In this way, an independent additional pressing of the upper seal 13 by means of the clamping spindles 14, on the one hand, and the lower seal 13' by means of the clamping spindles 14', on the other hand, is possible.

Stuffing boxes 15 and stuffing box nuts 16 are provided for sealing the clamping spindles 14 and 14'.

The reference number 17 designates various packing bores and 18 is used for repackable soft seals. 19 designates various control bores. An inhibiting connection bears the reference number 20, 21 is used for the line thereto. A connection 22 for an underground ball valve is associated with a line 23.

The sealing principle of the Hélicoflex seal 13 and 13' is based on the plastic deformation of its casing, whose elasticity is higher than that of the surrounding materials, caused by pressing. The helical spring 13a has so much force and elasticity that it counteracts, by means of the deformation force it requires, the deformation of the outer casing 13b by so much resistance force that a permanent contact between sealing faces and casing is assured.

When using a helical spring 13a as elastic core, each turn counteracts the pressing force during the radial compression of the seal thickness in total independence. These unusual properties in pressing and the elastic retentivity impart to the Hélicoflex seal the advantages of an elastomer seal under retention of the characteristics and advantages of metal seals.

A major advantage of this type of sealing resides in the low force requirement for pressing the seal.

For instance, Hélicoflex seal $\phi$ 7.9/7.5 mm with Monel casing:
  pressing force per cm seal length: 7000 N/cm for pressing
  pressing force per cm seal length: 1500 N/cm for maintaining tightness
  Monel seal (full annular cross section) $\phi$ 7.9 mm
  pressing force per cm seal length: 13,900 N/cm for pressing
  pressing force per cm seal length: 9040 N/cm for maintaining tightness.

I claim:

1. In a sealing structure for the upper end of a rising or conveying pipeline, which sealing structure is provided between the riser pipe hanger and the riser pipe cover, the improvement comprising that an annular groove or channel (7) is provided in the wall of the bore in the riser pipe cover (4) receiving the riser pipe hanger (2) or in the outer wall of the riser pipe hanger (2), in which groove an upper (8) and a lower (9) thrust collar or supporting ring are arranged in the direction of the axis (10) of the riser pipe side by side, which thrust collars (8,9) are provided on at least one of their front faces each with an inclined contact pressure shoulder (11), with a portion of each of said front faces remaining as a straight stop edge (12), that a metallic O-ring seal (13, 13') is inserted in the annular space defined by the contact pressure shoulder (11) facing the riser pipe hanger (2) and provided on the upper front face of the upper thrust collar (8) and by the riser pipe hanger (2) as well as in the annular space defined by the contact pressure shoulder facing the riser pipe cover (4) and provided on the lower front face of the lower thrust collar (9) and by the riser pipe cover (4), and that clamping spindles (14, 14') with conical front ends are distributed equidistally over the periphery of the riser pipe cover (4) and disposed essentially at right angles in relation to the axis (10) of the riser pipe, which front ends are provided for contacting the lower front face of the upper thrust collar (8) or the upper front face of the lower thrust collar (9).

2. The sealing structure according to claim 1, wherein a play is provided between the upper thrust collar or supporting ring (8) and the lower thrust collar or supporting ring (9).

3. The sealing structure according to claim 1, wherein the contact pressure shoulder (11) extends to the axis (10) of the riser pipe at an angle of 45 degrees.

4. The sealing structure according to claim 1, wherein the lower front face of the upper thrust collar (8) and the upper front face of the lower thrust collar (9) are also provided with inclined contact pressure shoulders (24, 24') facing the riser pipe cover (4).

5. The sealing structure according to claim 1, wherein the clamping spindles (14, 14') are provided to alternately contact only the lower front face of the upper thrust collar (8) or the upper front face of the lower thrust collar (9).

6. The sealing structure according to claim 1, wherein the metallic O-ring seal (13, 13') is formed in a manner known per se of an O-ring shaped helical spring (13a) having a double metal casing (13b).

7. The sealing structure according to claim 6, wherein the casings (13b) are slotted in a manner known per se and their edges overlap on the contact pressure shoulder (11).

* * * * *